United States Patent [19]

Grunsky

[11] Patent Number: 4,813,824
[45] Date of Patent: Mar. 21, 1989

[54] SINGLE-LIP DRILLING TOOL

[75] Inventor: Manfred Grunsky, Dreieich, Fed. Rep. of Germany

[73] Assignee: Stellram, S.A., Nyon, Switzerland

[21] Appl. No.: 90,023

[22] Filed: Aug. 27, 1987

[30] Foreign Application Priority Data

Aug. 27, 1986 [DE] Fed. Rep. of Germany ....... 3629033

[51] Int. Cl.⁴ .................. B23B 41/02; B23B 51/06
[52] U.S. Cl. ................................... 408/59; 408/57; 408/233; 408/705; 408/713
[58] Field of Search .............. 408/56, 57, 59, 233, 408/713, 705

[56] References Cited

U.S. PATENT DOCUMENTS

| | | | |
|---|---|---|---|
| 2,360,385 | 10/1944 | Anderson | 408/59 |
| 2,418,021 | 3/1947 | Fleischer | 77/68 |
| 3,138,043 | 6/1964 | Greuner | 408/59 |
| 4,060,335 | 11/1977 | Holloway et al. | 408/233 |
| 4,279,550 | 7/1981 | Kress et al. | 408/57 X |
| 4,493,596 | 1/1985 | Grunsky et al. | 408/233 |

FOREIGN PATENT DOCUMENTS 743355  11/1943  Fed. Rep. of Germany .
1191658   4/1965  Fed. Rep. of Germany .
2522565   9/1977  Fed. Rep. of Germany .

OTHER PUBLICATIONS

Botek-Tiefbohrwerkzeuge catalogue (undated).
Heller Bremen-Heller-Einlippen-Bohrwerkzeuge catalogue (undated).

Primary Examiner—Gil Weidenfeld
Assistant Examiner—Steven C. Bishop
Attorney, Agent, or Firm—Peter K. Kontler

[57] ABSTRACT

A single-lip solid drilling tool has a one-piece shank with an integral head having a radially or diametrically extending groove for a blade with an eccentric tip. The blade is held in its groove by several clamping screws so that it can be removed for sharpening or for replacement with a fresh blade. One or both lateral portions of the blade extend beyond the periphery of the head to guide the tool in actual use. The shank has an eccentric coolant hole whose discharge end is adjacent the blade and which is formed by providing a short cylindrical hard-metal blank with an eccentric axially parallel bore before the blank is stretched to reduce its diameter to a requisite value and to simultaneously reduce the diameter of the bore. The stretched blank is then machined to provide it with one or more chip evacuating flutes and, if necessary, with one or more grooves for discrete guide members which extend beyond the peripheral surface of the head.

5 Claims, 1 Drawing Sheet

SINGLE-LIP DRILLING TOOL

BACKGROUND OF THE INVENTION

The invention relates to drilling or boring tools in general, and more particularly to improvements in single-lip solid drilling tools of the type wherein a coolant channel extends longitudinally through the shank of the drilling tool and has a discharge end in the blade-carrying end portion or head of the shank.

In accordance with a prior proposal, the entire end portion of the shank of the single-lip solid drilling tool is made of a hard metal and is designed for the drilling of holes with a diameter of 2.5 to 32 mm. The cutting edge or edges and the guides or margins (if any) are ground directly into and onto the end portion. The end portion is bonded directly to the end of the tubular shank of the drilling tool. This is desirable when the tool is used for the drilling of deep holes, e.g., to drill bores in the barrels of rifles, shotguns and similar weapons. The tubular shank serves as a means for supplying coolant. The utilization of a tubular shank obviates the need for the drilling of a coolant hole in a solid shank, an operation which is complex and expensive if the length of the shank is to suffice for the drilling of bores in the barrels of rifles or in similar workpieces. The coolant holes should not be too large because this would necessitate a reduction of the cross-sectional area or areas of one or more grooves or flutes which serve for evacuation of shavings in the course of the drilling operation. Furthermore, the making of a relatively long small-diameter coolant hole or bore in the shank of an elongated drilling tool necessitates the utilization of a delicate and expensive long and slender drill.

Another drawback of conventional single-lip solid drilling tools is that the sharpening of a blade is extremely complex and expensive so that it is normally advisable to discard the entire tool instead of employing highly skilled persons who are capable of carrying out a satisfactory regrinding operation. Moreover, and even if an expert regrinder is available, the one-piece end portion of a conventional single-lip solid drilling tool cannot be reground more than a few times.

In accordance with another prior proposal, a single-lip solid drilling tool is provided with a separately produced blade which is made of a suitable hard metal and is bonded to the end portion of the shank. This contributes to lower cost of the tool because the entire end portion of the shank need not be made of an expensive high-quality hard metal. However, with the single exception of its lower cost, such drilling tool exhibits the same drawbacks as those of the single-lip drilling tools with blades which are integral parts of hard-metal boring heads, i.e., of one-piece end portions of the tools.

It was further proposed to provide so-called core drills and bore opening or reboring drills with throw-away indexible blades which are made of hard metal and are secured to the end portion of the shank by clamping screws. Such drilling tools cannot be used for the making of holes or bores with a diameter of less than 20 mm.

The utilization of clamping screws to secure blades to the heads of drilling tools is known in connection with so-called spade drills. Reference may be had to U.S. Pat. No. 4,060,335 granted Nov. 29, 1977 to Holloway and Grunsky.

OBJECTS AND SUMMARY OF THE INVENTION

An object of the invention is to provide a single-lip solid drilling tool whose useful life is longer than that of heretofore known single-lip drilling tools and wherein at least the majority of components can be reused as often and as long as desired.

Another object of the invention is to provide a single-lip solid drilling tool which can be used for the making of holes with very small, medium large or very large diameters and wherein the blade is secured to the end portion of the shank in a novel and improved way.

A further object of the invention is to provide a single-lip drilling tool wherein a detachable blade can serve as a means for guiding or centering the tool in the course of a drilling operation and wherein the channel or channels for admission of coolant do not take up a large portion of the shank and its head.

An additional object of the invention is to provide a single-lip solid drill which is more economical in use than heretofore known single-lip drilling tools that can be produced at the same cost.

Still another object of the invention is to provide a novel and improved method of securing the blade of a single-lip solid drill to the end portion of the shank.

The invention is embodied in a single-lip solid drilling tool which comprises a shank having a predetermined axis of rotation and including an end portion or boring head. The shank has a coolant channel with a discharge end in the end portion, and the tool further comprises a blade and means for separably securing the blade to the end portion of the shank. In accordance with a feature of the invention, such securing means comprises at least one clamping screw. The shank is or can be solid, and the channel can constitute a hole which extends longitudinally of the shank.

In accordance with one presently preferred embodiment of the invention, the major part of the blade is located at one side of the axis of rotation of the shank, and the blade includes a single guide portion which extends beyond the peripheral surface of the end portion of the shank. The tool then preferably further comprises at least one guide member which is provided in the end portion of the shank and extends beyond the peripheral surface of the end portion, preferably substantially diametrically opposite the guide portion of the blade.

Alternatively, the blade extends substantially diametrically across the entire end portion of the shank and includes two marginal guide portions which extend beyond the peripheral surface of the end portion substantially diametrically opposite each other, i.e., at opposite sides of the axis of rotation of the shank.

The securing means can comprise a plurality of clamping screws, and all such screws can be located at one side of the axis of rotation if the major part of the blade is located at one side of such axis. If the blade extends diametrically across the entire end portion of the shank, the securing means can comprise at least one first clamping screw at one side and at least one second clamping screw at the opposite side of the axis.

A tip of the blade is located at one side of the axis of rotation so that the blade can cut an annular groove into the surface at the bottom of a blind bore or hole which is drilled with the improved tool. The end portion of the shank can further comprise means for centering the blade.

The novel features which are considered as characteristic of the invention are set forth in particular in the appended claims. The improved drilling tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
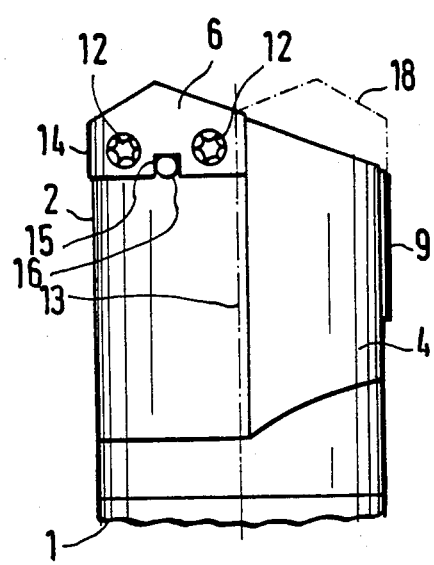
FIG. 1 is a fragmentary schematic elevational view of a single-lip solid drilling tool which embodies one form of the invention.
Figure 2:
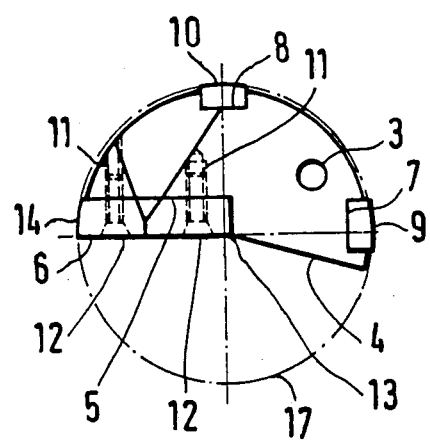
FIG. 2 is a plan view of the drilling tool which is shown in FIG. 1.

FIGS. 1 and 2 show a portion of a single-lip solid drilling tool which comprises an elongated shank 1 having an end portion or boring head 2. The shank 1 and its head 2 are made of a single piece of hard metal. In accordance with a presently preferred embodiment of the method of making the shank 1 and its head 2, a relatively short cylindrical blank of solid hard metal with an eccentric axially parallel bore or hole is stretched until the outer diameter of the resulting shank-head combination is reduced to a desired value. Such stretching results in simultaneous reduction of the diameter of the hole or bore which then constitutes a coolant channel or hole 3 (see FIG. 2). It will be noted that the hole 3 remains eccentric and can be closer to the peripheral surface than to the longitudinal axis 13 of the resulting shank-head combination. In the next step, the thus stretched blank is treated in a machine tool which removes from the stretched blank some material to form an elongated flute or groove 4 having a substantially V-shaped cross-sectional outline and serving for evacuation of shavings when the finished drilling tool is in use. Furthermore, the machine tool (such as a grinding machine) provides the head 2 with a substantially radially extending groove 5 which is formed in the front end face of the head and is adjacent the discharge end of the coolant channel 3. The groove 5 serves for reception of a portion of an eccentrically mounted blade or cutter 6. Still further, the machine tool provides the head 2 of the stretched blank with two additional axially parallel grooves 7, 8 which are machined into the peripheral surface of the head and serve for reception of discrete guide members 9, 10 each having a portion which projects radially beyond the peripheral surface of the head 2, the same as the centering or guide portion 14 of the properly inserted blade 6. The surface at the bottom of the groove 5 (considered in a direction at right angles to the axis 13 and upwardly, as seen in FIG. 2) is formed with two tapped bores 11 for the threaded shanks of two clamping screws 12 which serve to separably secure the blade 6 to the head 2 so that the blade fills the groove 5 and its guide portion 14 extends radially beyond the peripheral surface of the head 2. It will be seen that the major portion of the blade 6 is located at one side of the axis 13 and that both clamping screws 12 are located at such side of the axis.

The guide portion 14 is located diametrically opposite the guide member 9 in the groove 7, and the guide member 10 is located midway between the guide portion 14 and guide member 9 in the circumferential direction of the head 2. In other words, the common plane of the guide member 9 and guide portion 14 makes an angle of approximately or exactly 90° with a plane which includes the axis 13 and the guide member 10. The guide members 9 and 10 can be welded or soldered to the head 2.

The cutting edge of the blade 6 is V-shaped (see FIG. 1) and the rear or inner end face of the blade 6 has a notch 15 for a centering projection in the form of a pin 16 which is anchored in the head 2.

The cutting edge of the blade 6 is capable of drilling a hole (the surface bounding such hole is indicated in FIG. 2 by a phantom-line circle 17) because such cutting edge extends to both sides of the axis 13. If the hole which is drilled by the improved tool is a blind bore, the surface at the bottom of the blind bore is formed with an annular groove having a V-shaped outline 18 shown in FIG. 1 by phantom lines.

An advantage of the improved single-lip solid drilling tool is that the blade 6 can be readily removed for sharpening or for replacement with a fresh blade. The remaining major part 1, 2, 9, 10, 12, 12 of the improved tool can be reused as often and as long as desired.

The drilling tool of the present invention can be used for the making of bores or holes with diameters of less or more than 20 mm. This is due to the fact that the shank 1 is not a tube whose outer diameter cannot be selected at will and should not be reduced to less than 20 mm if the tool is to remain sufficiently stable. Furthermore, it is not even necessary to machine the coolant hole or channel 3 into the stretched blank; all that is necessary to form the coolant channel 3 is to provide the original (short) cylindrical blank with an eccentric axially parallel hole of requisite (relatively large) diameter; the diameter of such hole is reduced automatically in response to stretching of the original blank.

The guide member 10 can be omitted without departing from the spirit of the invention. Alternatively, the drilling tool of FIGS. 1–2 can have more than two guide members in addition to the guide portion 14 of the blade 6. It is further possible to replace the blade 6 with a narrower blade which is fully received in its groove 5. However, the illustrated design is preferred at this time because the portion 14 of the blade 6 can be used in lieu of an additional guide member, i.e., it is not necessary to form an additional groove (corresponding to the groove 7 or 8) for a guide member which is to replace the guide portion 14.

Figure 3:
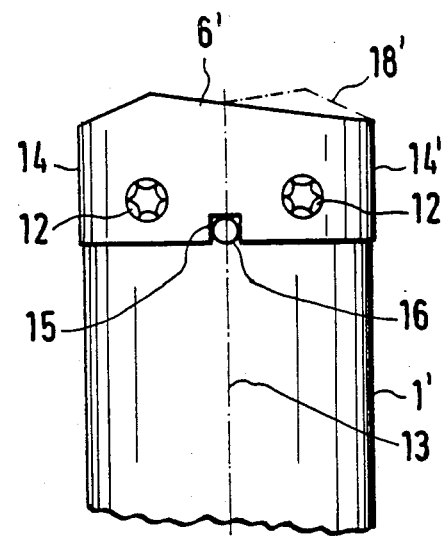
FIG. 3 is a fragmentary elevational view of a modified single-lip solid drilling tool.
Figure 4:
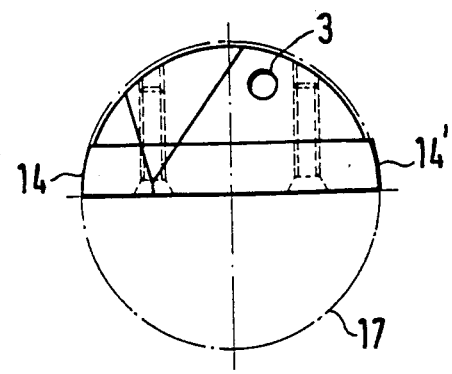
FIG. 4 is a plan view of the modified drilling tool.

FIGS. 3 and 4 show a portion of a modified single-lip solid drilling tool having a wider blade 6' with guide portions 14, 14' projecting beyond the peripheral surface of the head of the shank 1' diametrically opposite each other with reference to the axis 13. The centering projection 16 in the notch 15 of the blade 6' is located midway between the guide portions 14 and 14'. The guide members 9 and 10 and the grooves 7, 8 of the tool of FIGS. 1 and 2 are omitted. The outline 18' of the V-shaped annular groove which is formed by the eccentric tip of the blade 6' is indicated by phantom lines. One of the clamping screws 12 is located at one side and the other clamping screw is located at the other side of the axis 13. The outline 18' of the annular groove which can be cut by the blade 6' is somewhat shallower than the outline 18 of the groove which can be cut by the blade 6 of the tool shown in FIGS. 1 and 2. The shank 1' constitutes approximately one-half of a solid cylinder; the other half was removed to form the groove or flute for the evacuation of shavings.

An advantage of the embodiment which is shown in FIGS. 3 and 4 is that the stretched blank which includes the shank 1' and its head requires less machining because it need not be provided with the grooves 7 and 8. Moreover, it is not necessary to prepare discrete guide members (such as 9, 10) and to bond such guide members to the head.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A single-lip drilling tool, comprising a solid shank rotatable about a predetermined axis and including an end portion and a hole constituting a coolant channel, extending longitudinally of the shank and having a discharge end in said end portion, said end portion having a peripheral surface; a blade having a tip at one side of said axis; means for separably securing the blade to s aid end portion so that the major part of the blade is located at one side of said axis, said blade including a guide portion extending beyond the peripheral surface of said end portion and said securing means consisting of a plurality of clamping screws, all of s aid screws being located at one side of said axis; and a guide member provided on said end portion and extending beyond s aid peripheral surface substantially diametrically opposite said guide portion.

2. The tool of claim 1, wherein said end portion comprises means for centering said blade.

3. A single-lip drilling tool, comprising a shank rotatable about a predetermined axis and including an end portion and a coolant channel having a discharge end in said end portion, said end portion having a peripheral surface; a blade extending substantially diametrically across said end portion and including two guide portions extending beyond said peripheral surface at opposite sides of said axis; and means for separably securing said blade to said end portion, including at least one clamping screw.

4. The tool of claim 3, wherein at least the major part of said blade is disposed at one side of said axis.

5. A single-lip drilling tool, comprising a shank rotatable a bout a predetermined axis and including an end portion and a coolant channel having a discharge and in said end portion; a blade; and means for separably securing the blade to said end portion, including a first clamping screw at one side and a second clamping screw at the opposite side of said axis.

* * * * *